United States Patent Office 2,989,254
Patented June 20, 1961

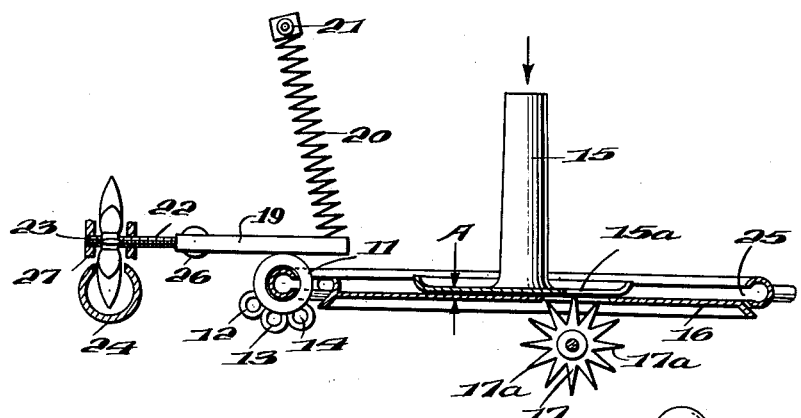
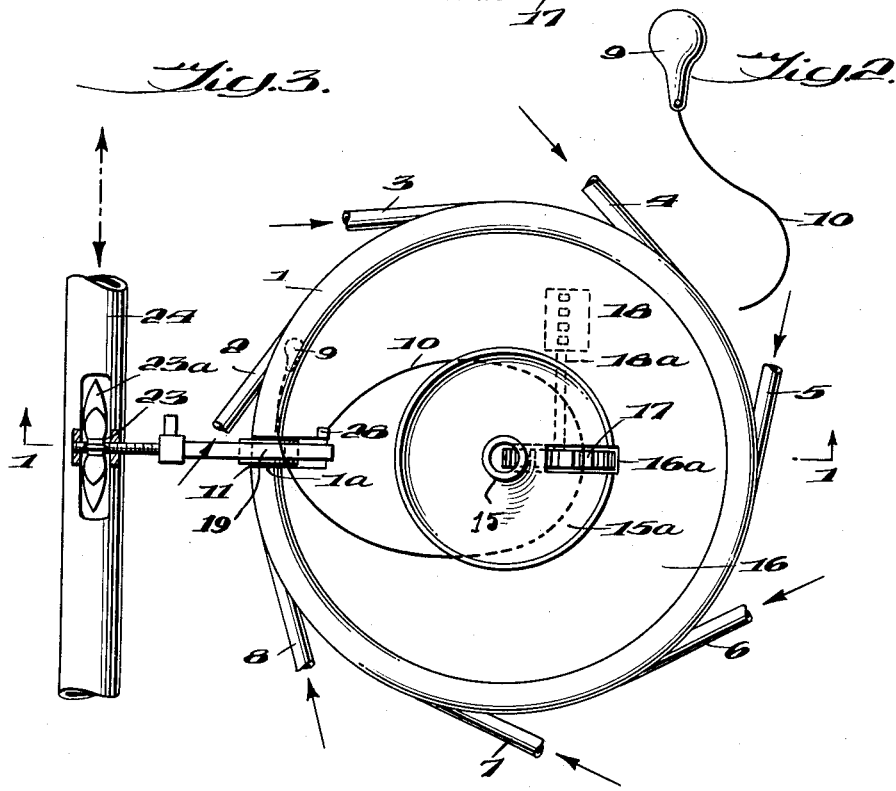

2,989,254
APPARATUS FOR WINDING WIRE ON EXTREMELY SMALL ANNULAR CORES
Alfred Pölzlbauer, Zurich, Switzerland, assignor to Micafil A.-G., Zurich, Switzerland, a joint-stock company
Filed Sept. 5, 1958, Ser. No. 759,272
Claims priority, application Austria Nov. 18, 1957
3 Claims. (Cl. 242—4)

This invention relates generally to an apparatus for winding wire on very small annular workpieces and more particularly to a pneumatically-operated winding device having an annular sleeve through which is directed a circularly movable wire-pulling runner to wind the wire continuously about a section of the workpiece.

Generally it is not possible to wind fine wire upon annular cores having a bore of 2 mm. or less by conventional winding apparatus of the type wherein a winding ring rotates transversely about an included section of the workpiece.

The primary object of the present invention is to provide a winding device for winding fine wire upon very small annular workpieces having small inside diameters on the order of 2 mm. or less.

A more specific object of my invention is to provide a winding apparatus having an annular tube with a radial cut-out portion into which is transversely inserted an annular workpiece, said tube being provided with a wire-pulling runner member which is pneumatically driven in a circular path within said tube to wind the wire upon said workpiece.

Other objects and advantages of my invention will become more apparent from a study of the following specification when viewed in the light of the accompanying drawing in which:

FIG. 1 is a transverse sectional view of the winding apparatus taken along line 1—1 of FIG. 3;

FIG. 2 is a detailed view of the wire-pulling runner member; and

FIG. 3 is an elevational view of the winding apparatus.

Referring now to the drawings, the annular tube 1 has an internal bore diameter on the order of 1 to 1.5 mm. and is provided with a plurality of tangentially directed air supply tubes 2—8. Adjacent its internal diameter the tube is provided with a continuous slot 25 through which the wire is radially introduced into the tube during the winding process as will be described in greater detail below.

In the tube is slidably positioned the spherical runner 9, illustrated in detail in FIG. 2, having an eyelet to which is secured one end of the wire 10. The runner 9 has an outer diameter which substantially equals but is slightly less than the tube internal diameter so that the runner may travel freely within the circular path defined by the tube.

The tube 1 has an open portion 1a into which is transversely inserted the annular workpiece or core 11. The workpiece is rotatably supported for rotation about its longitudinal axis by the rollers 12, 13 and 14.

During the winding operation compressed air is tangentially supplied into the tube by means of the supply tubes 2—8 to drive the runner 9 in a clockwise direction (as viewed in FIG. 3), one turn of wire being applied to the core 11 upon each complete revolution of the runner.

In order that the individual wire turns have a certain tension, a vertical trumpet-shaped tubular member 15 is positioned colinearly with respect to the axis of the tube and has a laterally flanged end portion 15a spaced a distance A from a baffle plate 16. Compressed air is introduced downwardly through the trumpet-shaped member 15 and is deflected radially outwardly toward the tube slot 25 by the baffle 16 to brake the wire loop as it passes between the baffle plate 16 and the lateral flange 15a.

Means for metering the rotation of the runner 9 within the annular tube 1 are provided as follows:

Extending upwardly through opening 16a in the baffle plate 16 are the fingers 17a of the meter star or toothed pinion gear 17 secured to shaft 18a of the meter 18. During one revolution of the runner 9 within the tube 25 the meter shaft 18a is rotated by one tooth pitch to cause a digit registration on the meter 18. If desired, the meter may be set for a predetermined number of turns so that when the desired number of turns has been applied to the ring workpiece, the meter closes a suitable contact (not shown) to interrupt the supply of compressed air to the system.

In order to rotate the annular workpiece about its longitudinal axis during the winding operation a feed beam 19 longitudinally movable within the fixed bearing 26 is maintained in engagement with the periphery of the workpiece by tension spring 20 secured at one end to the fixed bearing 21. At one end the feed beam 19 is provided with a threaded spindle 22 onto which is threadedly mounted nut 23 having radially extending vanes 23a. The nut 23 is rotatably mounted in fixed bearing means 27 and is rotatably driven by the vanes 23a upon the passage of fluid through conduit 24 into which the vanes extend. Upon the rotation of nut 23 in one direction the feed beam 19 is moved to the left in the figures by means of the fine-pitched screw threads on the spindle 22 to rotate the workpiece about its longitudinal axis in the counterclockwise direction. Thus the winding speed of the runner 9 in the tube 1, the rotational speed of the feed nut 23, and the wire braking force may all be regulated by controlling the force of the compressed air by means of suitable adjustable reducing valves.

When one annular workpiece 11 has been wound, the feed of the next ring core can be effected in the opposite direction by reversing the direction of rotation of the feed air screw by suitable compressed air reversal means.

The wire may be fed to the wire guide 28 either from an external wire source or from a wire reel rotatably mounted on the lower side of the baffle plate 16.

While in accordance with the patent statutes I have illustrated and described the best embodiment of my invention now known to me, it will be apparent to those skilled in the art that other changes and modifications may be made in the apparatus described without deviating from the scope of the invention as recited in the following claims:

I claim:

1. In a winding device for winding fine wire on a small annular workpiece and including a stationary annular tube having a continuous peripheral slot centrally located in the inner peripheral surface thereof and also having a radial cut-out portion for transversely receiving said annular workpiece, said annular tube having a plurality of tangentially-arranged nozzles through which pressure fluid is introduced to establish a unidirectional flow of fluid within said tube, a runner slidably positioned within said tube, a length of wire secured at one end to said runner, said runner being driven in a circular path by the pressure fluid and through the bore of the annular workpiece to pull the wire through the tube slot to continuously wind the wire upon the workpiece; the improvement which consists of means for braking and tensioning the wire during winding thereof on said annular workpiece comprising a baffle plate arranged within and parallel to said tube adjacent the tube peripheral slot, a tubular member colinearly arranged with respect to the longitudinal axis of said tube, said tubular member terminating at one end in a flanged portion spaced from said baffle plate, and means for forcing fluid under pressure axially through said tubular member for direct impingement on said baffle plate for radial outward diversion thereby to brake and tension a wire loop as it passes between the baffle plate and the flanged end portion of said tubular member.

2. A winding device as defined in claim 1, and further including means for metering the number of turns of wire wound on said workpiece comprising a meter shaft having a gear secured thereon, the teeth of said gear extending into the plane of said tube peripheral slot to cause one of the teeth of said gear to be engaged by a portion of the wire upon a revolution of the runner in the tube to rotate said meter shaft by an angle corresponding to the pitch of the gear teeth.

3. A winding device as defined in claim 1, and further including roller means for rotatably supporting said workpiece, and means for rotating said workpiece about its longitudinal axis comprising a feed beam axially movable within fixed bearings, spring means biasing said feed beam into peripheral engagement with said workpiece, said feed beam having a threaded spindle portion into which is threadably mounted a screw nut rotatably supported in fixed bearings, said screw nut having peripheral vanes thereon extending radially outwardly therefrom and into a fluid pressure conduit, and means for directing fluid pressure alternately in opposite directions in said conduit to alternately rotate said nut and alternately reciprocate said feed beam to rotate successive workpieces in opposite directions.

References Cited in the file of this patent

UNITED STATES PATENTS

| | | |
|---|---|---|
| 2,588,139 | McCarthy | Mar. 4, 1952 |
| 2,921,751 | Aveni | Jan. 19, 1960 |

FOREIGN PATENTS

| | | |
|---|---|---|
| 264,677 | Germany | Sept. 26, 1913 |